United States Patent
Eloy

(10) Patent No.: US 8,600,613 B2
(45) Date of Patent: Dec. 3, 2013

(54) METHOD FOR MONITORING THE PRESSURE IN A WHEEL TIRE AND MONITORING SYSTEM

(71) Applicant: Johnson Controls Technology Company, Holland, MI (US)

(72) Inventor: Frederic Eloy, Mezieres sur Seine (FR)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/657,577

(22) Filed: Oct. 22, 2012

(65) Prior Publication Data

US 2013/0046437 A1     Feb. 21, 2013

Related U.S. Application Data

(63) Continuation of application No. PCT/EP2011/001730, filed on Apr. 7, 2011.

(30) Foreign Application Priority Data

Apr. 24, 2010   (DE) .......................... 10 2010 018179
Oct. 18, 2010   (FR) ....................................... 1004080

(51) Int. Cl.
*G06F 7/00*     (2006.01)
(52) U.S. Cl.
USPC ........................................................ 701/34.1
(58) Field of Classification Search
USPC ............... 701/34.1, 36, 30.4, 30.5, 30.8, 30.9
See application file for complete search history.

(56) References Cited

U.S. PATENT DOCUMENTS

| | | | |
|---|---|---|---|
| 5,963,128 A | 10/1999 | McClelland | |
| 2001/0032500 A1* | 10/2001 | Ohashi et al. | ................... 73/146 |
| 2003/0179086 A1* | 9/2003 | Nantz et al. | ................... 340/445 |
| 2005/0044945 A1 | 3/2005 | Hammerschmidt | |
| 2008/0266073 A1 | 10/2008 | Tu et al. | |

OTHER PUBLICATIONS

International Search Report for application No. PCT/EP2011/001730 mailed Apr. 7, 2011.

* cited by examiner

*Primary Examiner* — Kim T Nguyen
(74) *Attorney, Agent, or Firm* — Fletcher Yoder P.C.

(57) ABSTRACT

A sensor module generates a momentary tire pressure signal, and a transmitting module transmits the momentary pressure information. A management module receives and processes the information and includes a first predetermined pressure value corresponding to a higher speed for the vehicle, and a second predetermined pressure value corresponding to a lower speed, the first predetermined pressure value being greater than the second predetermined pressure value. The method includes comparing the momentary pressure value to a target pressure value, the target pressure value corresponding to either the first predetermined pressure value or the second predetermined pressure value, selecting the first predetermined pressure value as the target pressure value when the momentary pressure is too low relative to the second predetermined pressure value, and selecting the second predetermined pressure value as the target pressure value when the momentary pressure is too high relative to the first predetermined pressure value.

7 Claims, 3 Drawing Sheets

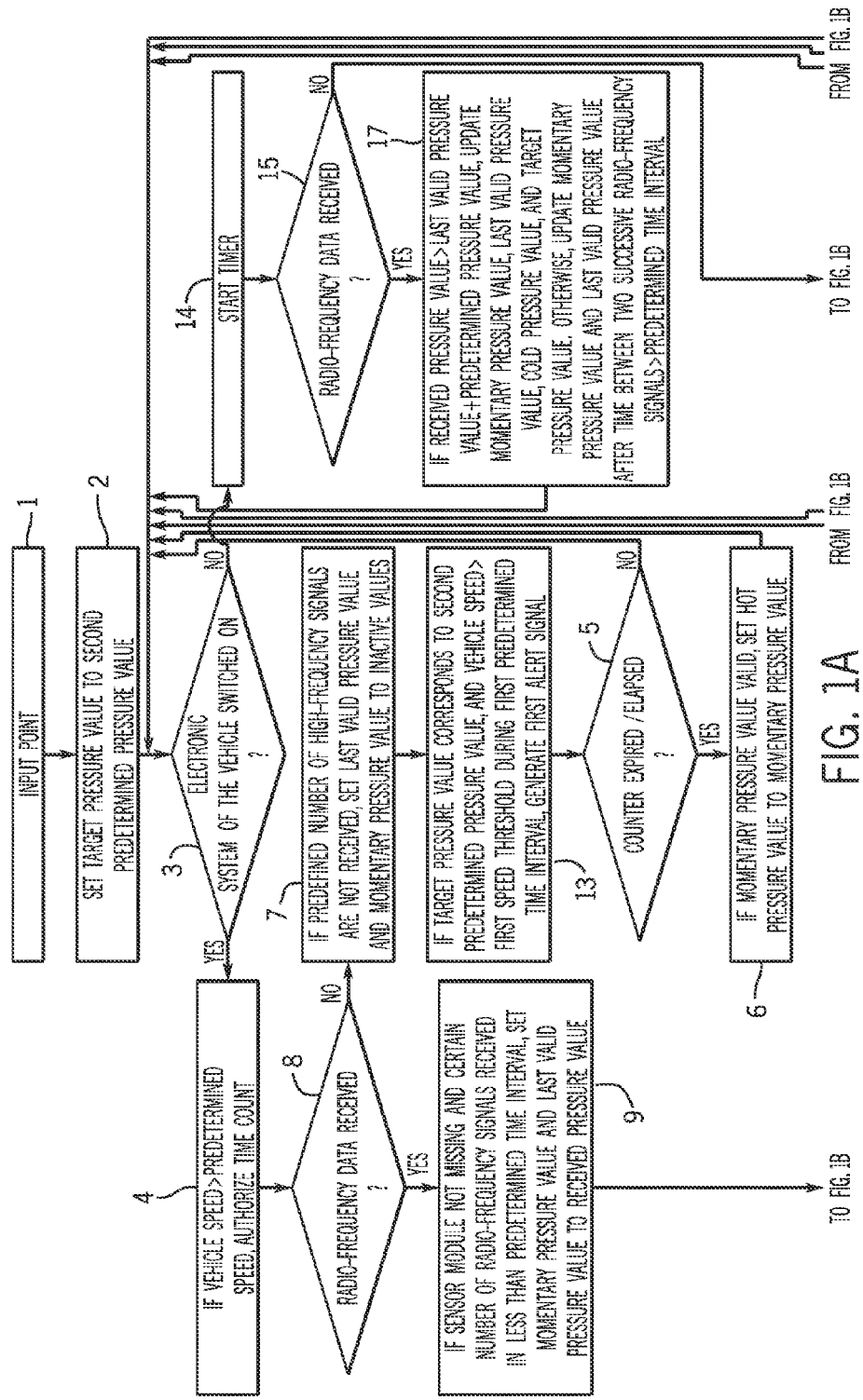

METHOD FOR MONITORING THE PRESSURE IN A WHEEL TIRE AND MONITORING SYSTEM

CROSS REFERENCE TO RELATED APPLICATIONS

Figure 1B:
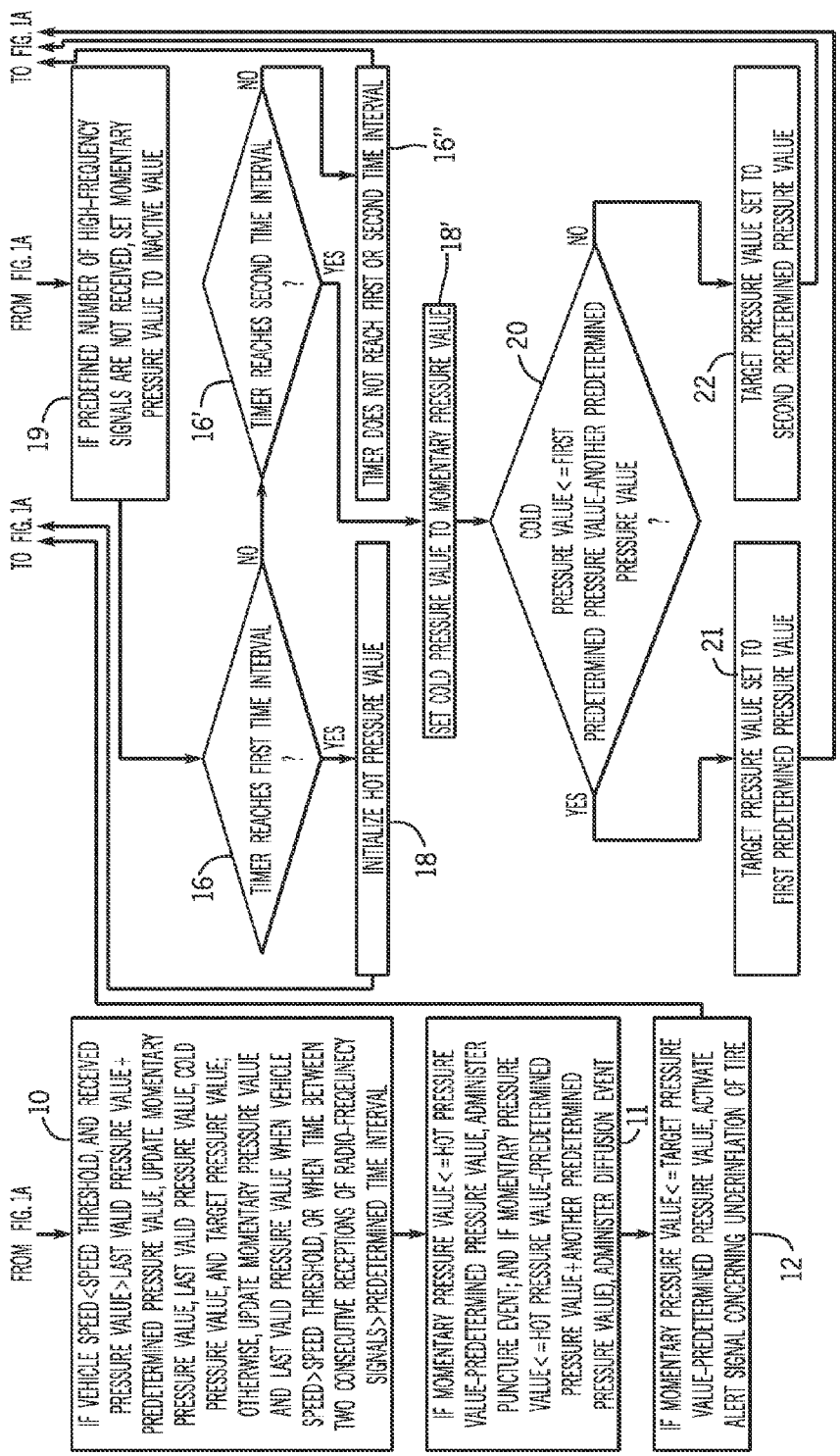

This application is a continuation of PCT Application No. PCT/EP2011/001730, filed on Apr. 7, 2011, which claims priority from and the benefit of German Patent No. DE 10 2010 018 149.8, filed on Apr. 24, 2010; and French Patent No. 10/04080, filed on Oct. 18, 2010; each application is herein incorporated by reference.

BACKGROUND

The present invention relates to a method for monitoring the pressure in a tire of a wheel, and a system for monitoring the pressure in a tire of a wheel.

In order to ensure the safety and the comfort of the driver of a motor vehicle, it is essential to know and to monitor the pressure of the tires of the vehicle. Providing the driver with information as to the level of inflation of the tires of his or her vehicle in a simple, reliable and regular manner helps to enhance the safety thereof, the consumption, to extend the life of the tires, etc. Such systems generally comprise at least one pressure sensor of a type that is known per se.

Methods for monitoring the pressure of the tires of a vehicle are known, which inform the driver or the alert system of the vehicle of a situation of underinflation of at least one of the tires of the vehicle.

Moreover, it is known that the tires of a vehicle require a higher pressure when the vehicle is running at higher speeds.

One drawback of such devices according to the prior art lies in the fact that the setting of the monitoring of the pressure in a tire generally takes account of a single predetermined pressure value, which leads to sub-optimal results both for high speeds and for lower speeds.

The particular aim of the present invention is to overcome the drawbacks of the prior art, and notably those cited above, and also to propose a monitoring method which takes into account different pressure levels for different speeds.

SUMMARY

According to the present invention, this aim is achieved by a method for monitoring the pressure in a tire of a wheel, in particular of a motor vehicle, the motor vehicle comprising a sensor module generating a signal indicative of a momentary pressure value in the tire, the motor vehicle also comprising a transmission module and a reception module for transmitting the information of the momentary pressure value in the tire to a management module, the management module being capable of receiving and processing the information supplied, the management module including a first predetermined pressure value corresponding to a higher vehicle speed value, and the management module including a second predetermined pressure value corresponding to a lower vehicle speed value, the first predetermined pressure value being greater than the second predetermined pressure value, the monitoring method comprising the following steps:

comparison of the momentary pressure value with a target pressure value, the target pressure value corresponding either to the first predetermined pressure value or to the second predetermined pressure value, choice of the first predetermined pressure value as target pressure value when the momentary pressure is too low relative to the second predetermined pressure value, and choice of the second predetermined pressure value as target pressure value when the momentary pressure is too high relative to the first predetermined pressure value.

By virtue of such an embodiment of a monitoring method, it is advantageously possible to change the target pressure value used by the management module in the tire pressure monitoring process: it is possible to change the target pressure value from the first predetermined pressure value to the second predetermined pressure value (that is to say from the value associated with the use of the high or elevated speeds of the vehicle to the value associated with the use only of the low or less high speeds of the vehicle), and it is also possible to change the target pressure value from the second predetermined pressure value to the first predetermined pressure value (that is to say from the value associated with the use of the high or elevated speeds of the vehicle, that is to say from the value associated with the use only of the low or less high speeds of the vehicle to the value associated with the use of the high or more elevated speeds of the vehicle). The method according to the present invention can be produced so as to be robust in different operational situations. In particular, it is advantageously possible to fulfill the conditions of a European standard concerning systems for monitoring the pressure in the tires of vehicles.

A preferred refinement of the invention lies in the fact that the choice of the target pressure value is changed only when
  the tire corresponds to a cold state or
  the pressure in the tire has been increased by more than a third predetermined pressure value.

By virtue of such an embodiment of a monitoring method, it is advantageously possible to change the target pressure value safely.

Yet another preferred refinement of the invention lies in the fact that, in the cold state of the tire, the tire is stopped during at least a third time interval.

A particularly preferred refinement of the invention lies in the fact that a first alert signal is generated when:
  the target pressure value corresponds to the first predetermined pressure value, and
  the vehicle speed is greater than a first speed threshold during a first predetermined time interval.

Another particularly preferred refinement of the invention lies in the fact that the first alert signal is cleared when:
  the target pressure value corresponds to the first predetermined pressure value, and
  the vehicle speed is less than a second speed threshold during a second predetermined time interval, the first speed threshold being greater than the second speed threshold.

By virtue of such an embodiment of a monitoring method, it is advantageously possible to react flexibly in different tire pressure conditions.

Yet another preferred refinement of the invention lies in the fact that a second alert signal is generated when the momentary pressure value is too low relative to the target pressure value.

Moreover, the present invention also relates to a system for monitoring the pressure in a tire of a wheel, in particular of a motor vehicle, the system comprising a sensor module generating a signal indicative of a momentary pressure value in the tire, the system also comprising a transmission module and a reception module for transmitting the information of the momentary pressure value in the tire to a management module, the management module being capable of receiving and processing the information supplied, the management module including a first predetermined pressure value corresponding to a higher vehicle speed value, and the management module including a second predetermined pressure value corresponding to a lower vehicle speed value, the first predetermined pressure value being greater than the second predetermined pressure value, the system being designed such that the target pressure value corresponds either to the first predetermined pressure value or to the second predetermined pressure value, and that the choice of the first predetermined pressure value as target pressure value is made when the momentary pressure is too low relative to the second predetermined pressure value, and that the choice of the second predetermined pressure value as target pressure value is made when the momentary pressure is too high relative to the first predetermined pressure value.

Other features and advantages of the invention will become apparent from reading the following description of a particular nonlimiting embodiment of the present invention.

DRAWINGS

Figure 2:
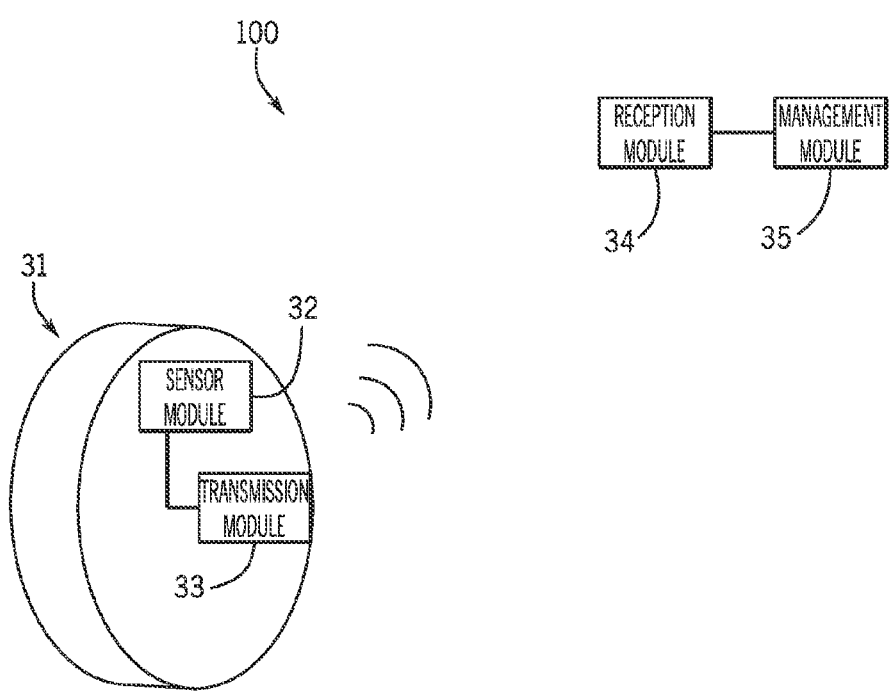

The invention will be better understood from the following description, which relates to preferred embodiments, given as nonlimiting examples and explained with references to the appended schematic drawing, in which:

FIGS. 1A and 1B are schematic views of a flow diagram of the monitoring method according to the present invention, and FIG. 2 is a schematic view of a monitoring system according to the present invention.

DETAILED DESCRIPTION

As FIG. 2 of the appended drawing shows, a system 100 for monitoring the pressure in a tire 31 of a wheel, in particular of a motor vehicle, comprises at least one sensor module 32. The sensor module 32 generates a signal indicative of a momentary pressure value in the tire 31 concerned. Normally, the vehicle comprises two, three, four or more than four wheels and one tire 31 for each wheel. In this case, it is preferable according to the present invention for the monitoring system 100 to comprise a sensor module 32 for each tire 31. The monitoring system 100 also comprises—preferably for each tire 32—a transmission module 33 and a reception module 34 for transmitting the information of the momentary pressure value in the tire to a management module 35 of the monitoring system 100 (this module 35 can also be incorporated in the reception module 34). The management module 35 receives and processes the information item or items supplied. Preferably, the information concerning the values measured by the sensor module 32 (or the plurality of sensor modules 32 present in the monitoring system 100) is transmitted (via the transmission 33 and reception 34 modules) by a radio-frequency signal.

The management module 35 stores a first predetermined pressure value and a second predetermined pressure value. The first predetermined pressure value corresponds to a higher vehicle speed value, and the second predetermined pressure value corresponds to a lower vehicle speed value, the first predetermined pressure value being greater than the second predetermined pressure value.

According to the present invention, the monitoring method comprises the following steps:
comparison of the momentary pressure value with a target pressure value, the target pressure value corresponding either to the first predetermined pressure value or to the second predetermined pressure value,
choice of the first predetermined pressure value as target pressure value when the momentary pressure is too low relative to the second predetermined pressure value, and
choice of the second predetermined pressure value as target pressure value when the momentary pressure is too high relative to the first predetermined pressure value.

An example of a flow diagram of the method according to the present invention is shown in FIGS. 1A and 1B. The reference signs of FIGS. 1A and 1B are explained below:

The reference sign 1 designates an input point in the inventive method according to the present invention.

The reference sign 2 designates an initialization phase in which:
the target pressure value (P_Preco) is chosen as being the second predetermined pressure value (P_Low_Speed),
a cold pressure value (P_Cold(I)) is set equal to an inactive value (for example 0xFF),
a hot pressure value (P_Warm(I)) is set equal to an inactive value (for example 0xFF),
a last valid pressure value (P_Last Valid(I)) is set equal to an inactive value (for example 0xFF),
a momentary pressure value (P_Current(I)) is set equal to an inactive value (for example 0xFF).

The reference sign 3 designates a query as to whether the electronic system of the vehicle is switched on. If the query is positive, the method branches to the step designated by the reference sign 4. If the query is negative, the method branches to the step designated by the reference sign 14.

The reference sign 4 designates an action which authorizes the time count if, and only if, the vehicle speed is greater than a predetermined speed (40 km/h for example). This time count is performed as long as the counter (Driving_Time) is less than 15 minutes. The method branches to the steps designated by the reference signs 8 and 7.

The reference sign 5 designates a query as to whether the counter of the step designated by the reference sign 4 has expired/elapsed, that is to say whether this counter has reached a value greater than a predetermined value (for example 15 minutes). If the query is positive, the method branches to the step designated by the reference sign 6. If the query is negative, the method branches to the step designed by the reference sign 3.

The reference sign 6 designates a query as to whether the momentary pressure value (P_Current(I)) is valid. If the query is positive, the hot pressure value (P_Warm(I)) is considered to be equal with the momentary pressure value (P_Current(I)). The method branches to the step designated by the reference sign 3.

The reference sign 7 designates a step concerning the administration of missing sensor modules 32. If a predefined number (for example nine) of high-frequency signals are not received by the reception module 34, the sensor module 32 concerned is taken to be missing. The last valid pressure value (P_Last Valid(I)) is set to an inactive value (for example 0xFF), the momentary pressure value (P_Current(I)) is set to an inactive value (for example 0xFF). If at least one sensor module 32 is missing, a "monitoring system omission" alert signal is set to the active state. At the end of this step the method branches to the step 13 regardless of the result of the query.

The reference sign 8 designates a query as to whether radio-frequency data have been received. If the query is positive, the method branches to the step designated by the reference sign 9. If the query is negative, the method branches to the step designated by the reference sign 7.

The reference sign 9 designates a query as to whether a sensor module 32 is missing and whether, at the same time, a certain number of radio-frequency signals (for example two) have been received in less than a predetermined time interval (for example three minutes). If the query is positive, the sensor module 32 is considered not to be missing, the momentary pressure value (P_Current(I)) is considered to be equal with the received pressure value (P_Received (I)) and the last valid pressure (P_Last Valid(I)) is considered to be equal with the pressure value received (P_Received(I)), all the errors associated with this sensor module 32 are cleared. The method branches to the step designated by the reference sign 10.

The reference sign 10 designates a pressure setting step. When:

the vehicle speed is less than a speed threshold, for example 4 km/h, or the first radio-frequency signal has been received after the vehicle speed has become greater than a speed threshold, for example 4 km/h, and the received pressure value (P_Received(I)) is greater than the last valid pressure value (P_Last Valid(I)) plus a predetermined pressure value, for example 120 hPa. In this case:

all the errors associated with this sensor module 32 are cleared, an update of the momentary pressure (P_Current(I)), the last valid pressure (P_Last Valid(I)), the cold pressure (P_Cold(I)), and the target pressure (P_Preco) values is performed. When the following condition:

the vehicle speed is less than a speed threshold, for example 4 km/h, or the first radio-frequency signal has been received after the vehicle speed has become greater than a speed threshold, for example 4 km/h, and the received pressure value (P_Received(I)) is greater than the last valid pressure value (P_Last Valid(I)) plus a predetermined pressure value, for example 120 hPa is not fulfilled, an update of the momentary pressure (P_Current(I)), the last valid pressure (P_Last Valid(I)) values is done when the vehicle speed is greater than a speed threshold, for example 4 km/h or when the time between two consecutive receptions of radio-frequency signals (from the same sensor module 32) is greater than a predetermined time interval, for example 60 seconds. The method branches to the step designated by the reference sign 11.

The reference sign 11 designates a query as to whether the condition is fulfilled according to which the momentary pressure value (P_Current(I)) is valid and the hot pressure value (P_Warm(I)) is valid. In this case an administration of a "puncture" event is performed when the momentary pressure value (P_Current(I)) is less than or equal to the hot pressure value (P_Warm(I)) minus a predetermined pressure value (DeltaP), and an administration of a "diffusion" event is performed when the momentary pressure value (P_Current(I)) is less than or equal to the hot pressure value (P_Warm(I)) minus the sum of a predetermined pressure value (DeltaP) and a predetermined pressure value, for example 70 hPa. At the end of this step, the method branches to the step 12 regardless of the result of the query.

The reference sign 12 designates a query as to whether the condition is fulfilled according to which the momentary pressure value (P_Current(I)) is valid and the momentary pressure value (P_Current(I)) is less than or equal to the target pressure value (P_Preco) minus a predetermined pressure value, for example 400 hPa. In this case, an alert signal is activated concerning the underinflation of the tire concerned.

If the condition is fulfilled according to which the momentary pressure value (P_Current(I)) is valid and, for all the tires (or all the wheels), the momentary pressure value (P_Current (I)) is less than or equal to the target pressure value (P_Preco) minus a predetermined pressure value, for example 400 hPa, an alert signal is activated concerning the underinflation. The method branches to the step designated by the reference sign 3.

The reference sign 13 designates a step of the method according to which a first alert signal is generated when the target pressure value (P_Preco) corresponds to the second predetermined pressure value, and the vehicle speed is greater than a first speed threshold (for example 160 km/h) during a first predetermined time interval (for example 5 minutes). The first alert signal is cleared when the target pressure value (P_Preco) corresponds to the first predetermined pressure value, and the vehicle speed is less than a second speed threshold (for example 100 km/h) during a second predetermined time interval (for example 5 minutes). The method branches to the step designated by the reference sign 5.

The reference sign 14 designates a step of the method according to which a timer is started (which counts the time of absence of movement of the vehicle). The method branches to the step designated by the reference sign 15. The reference sign 15 designates a query as to whether radio-frequency data have been received. In the affirmative case, the method branches to the step designated by the reference sign 17. In the negative case, the method branches to the step designated by the reference sign 19.

The reference sign 16 designates a query as to whether the timer of the step 14 has reached a predetermined time interval, for example 45 minutes. In the affirmative case, the method branches to the step designated by the reference sign 18. The reference sign 16' designates a query as to whether the timer of the step 14 has reached another predetermined time interval, for example 70 minutes. In the affirmative case, the method branches to the step designated by the reference sign 18'.

The reference sign 16" designates a query as to whether none of the situations of the steps 16 and 16' apply. In this case, the method branches to the step designated by the reference sign 3.

The reference sign 17 designates a pressure setting step. When:

the received pressure value (P_Received(I)) is greater than the last valid pressure value (P_Last Valid(I)) plus a predetermined pressure value, for example 120 hPa. In this case:

all the errors associated with this sensor module 32 are cleared, an update of the momentary pressure (P_Current(I)), the last valid pressure (P_Last Valid(I)), the cold pressure (P_Cold(I)), and the target pressure (P_Preco) values is performed. Otherwise, an update of the momentary pressure (P_Current(I)), the last valid pressure (P_Last Valid(I)) values is done when the time between two successive radio-frequency signals from the same sensor module 32 is greater than a predetermined time interval, for example sixty seconds. The method branches to the step designated by the reference sign 3.

The reference sign 18 designates an intermediate step of initialization of the hot pressure (P_Warm(I)) is set to non-valid. The reference sign 18' designates a step for setting the cold pressure value (P_Cold(I)) equal to the momentary pressure value (P_Current(I)). The method branches to the step designated by the reference sign 20.

The reference sign 19 designates the administration of missing sensor modules 32. If a predefined number (for example four) of high-frequency signals are not received by the reception module 34, for a sensor 32 concerned, the momentary pressure value from this sensor is set equal to an inactive value (for example 0xFF). The method branches to the step designated by the reference sign 16, 16' and 16".

The reference sign 20 designates a query as to whether, for all the tires (or for all the wheels), the cold pressure value (P_Cold(I)) is less than or equal to the first predetermined pressure value minus a certain predetermined pressure value, for example 100 hPa. In the affirmative case, the method branches to the step designated by the reference sign 21. In the contrary case, the method branches to the step designated by the reference sign 22.

The reference sign 21 designates a step of the method during which the target pressure value (P_Preco) is set equal to the first predetermined pressure value. The method branches to the step designated by the reference sign 3.

The reference sign 22 designates a step of the method during which the target pressure value (P_Preco) is set equal to the second predetermined pressure value. The method branches to the step designated by the reference sign 3.

The invention claimed is:

1. A method for monitoring pressure in a tire of a wheel of a motor vehicle, the motor vehicle comprising a sensor module generating a signal indicative of a momentary pressure value in the tire, the motor vehicle also comprising a transmission module and a reception module for transmitting information of the momentary pressure value in the tire to a management module, the management module being capable of receiving and processing the information supplied, the management module including a first predetermined pressure value corresponding to a higher vehicle speed value, and the management module including a second predetermined pressure value corresponding to a lower vehicle speed value, the first predetermined pressure value being greater than the second predetermined pressure value, the monitoring method comprising:
    comparing the momentary pressure value with a target pressure value, the target pressure value corresponding either to the first predetermined pressure value or to the second predetermined pressure value;
    choosing the first predetermined pressure value as target pressure value when the momentary pressure is too low relative to the second predetermined pressure value; and
    choosing the second predetermined pressure value as target pressure value when the momentary pressure is too high relative to the first predetermined pressure value.

2. The monitoring method as claimed in claim 1, wherein the choice of the target pressure value is changed only when the tire is in a cold state or the pressure in the tire has been increased by more than a third predetermined pressure value.

3. The monitoring method as claimed in claim 2, wherein, in the cold state of the tire, the tire is stopped during at least a third time interval.

4. The monitoring method as claimed in claim 1, wherein a first alert signal is generated when the target pressure value corresponds to the second predetermined pressure value, and the vehicle speed is greater than a first speed threshold during a first predetermined time interval.

5. The monitoring method as claimed in claim 4, wherein the first alert signal is cleared when the target pressure value corresponds to the first predetermined pressure value, and the vehicle speed is less than a second speed threshold during a second predetermined time interval, the first speed threshold being greater than the second speed threshold.

6. The monitoring method as claimed in claim 4, wherein a second alert signal is generated when the momentary pressure value is too low relative to the target pressure value.

7. A system for monitoring pressure in a tire of a wheel of a motor vehicle, the monitoring system comprising a sensor module generating a signal indicative of a momentary pressure value in the tire, the monitoring system also comprising a transmission module and a reception module for transmitting information of the momentary pressure value in the tire to a management module, the management module being capable of receiving and processing the information supplied, the management module including a first predetermined pressure value corresponding to a higher vehicle speed value, and the management module including a second predetermined pressure value corresponding to a lower vehicle speed value, the first predetermined pressure value being greater than the second predetermined pressure value, the system being designed such that the target pressure value corresponds either to the first predetermined pressure value or to the second predetermined pressure value, and that a choice of the first predetermined pressure value as target pressure value is made when the momentary pressure is too low relative to the second predetermined pressure value, and that the choice of the second predetermined pressure value as target pressure value is made when the momentary pressure is too high relative to the first predetermined pressure value.

* * * * *